Dec. 4, 1956
F. F. ZODY ET AL
2,772,720
GOLF CART SEAT
Filed Feb. 3, 1955
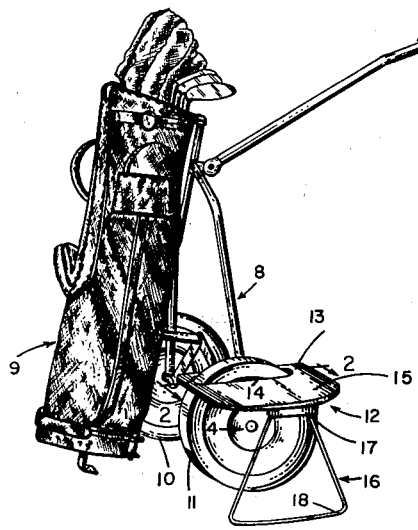
FIG.1
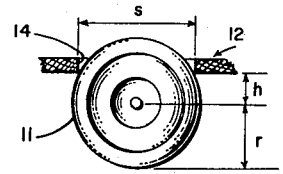
FIG.2
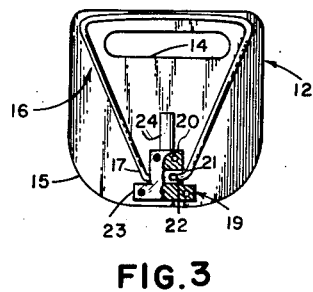
FIG.3
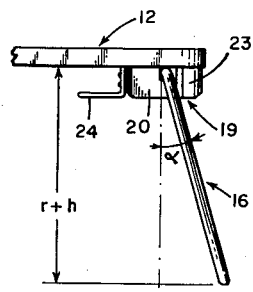
FIG.4
FIG.5
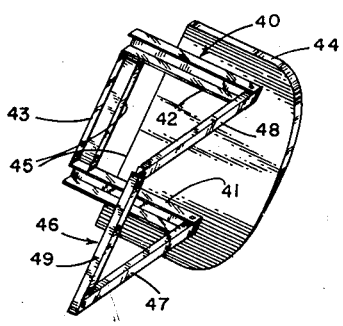
FIG.6
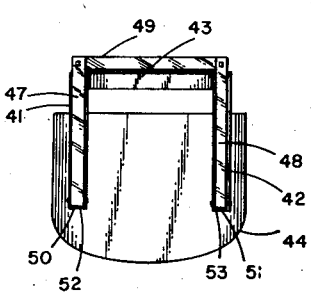
FIG.7
*INVENTORS.*
FORREST F. ZODY,
JOHN E. KEY Jr.
WOOD N. TAYLOR Jr.
BY Robert Hockfield
THEIR ATTORNEY.

United States Patent Office 2,772,720
Patented Dec. 4, 1956

2,772,720
GOLF CART SEAT

Forrest F. Zody and John E. Key, Jr., Houston, and Wood N. Taylor, Jr., Bellaire, Tex., assignors to Junior Achievement, Inc., New York, N. Y., a corporation of Massachusetts Application February 3, 1955, Serial No. 485,896

9 Claims. (Cl. 155—5)

This invention relates to seats and, more particularly, pertains to new and improved portable seats adapted to be operatively associated with the wheel of a golf cart or the like.

In pursuing the sport of golf, a player may often have an opportunity to rest during the opponent's play or other normal periods of delay. For the comfort of the golfer, it has been proposed that the cart on which his golf clubs may be transported be equipped with a seat. Usually, this type of seat is an integral part of the golf cart mechanism and in a collapsible type of cart the provision of a seat may undesirably complicate the mechanism. Moreover, there are a great many golf carts presently in use which are not so equipped.

It is therefore an object of the present invention to provide a new and improved portable seat adapted to be remobaly associated with a golf cart or the like.

Another object of the present invention is to provide a new and improved seat which may be detachably associated with the wheel of a golf cart to provide a seat for rest during the opponent's play or other normal periods of delay.

Yet another object of the present invention is to provide a new and improved portable seat which may be readily folded into a comparatively small space for greater carrying convenience.

A portable seat in accordance with the present invention is adapted to be operatively associated with the wheel of a golf cart or the like and comprises a seat member including a portion having a slot for receiving a portion of the wheel. Leg means is connected to an opposite portion of the seat member and extends therefrom an effective distance greater than the radius but smaller than the diameter of the wheel.

According to a particular embodiment of the invention, the seat member is in the form of a flat plate and an opening in the plate defines the aforesaid slot.

In accordance with another embodiment of the invention the seat member includes a generally U-shaped frame having arm portions and a bight portion. A load-supporting member is fixed to the arm portions of the U-shaped frame and is spaced from the bight portion thereof to define the aforesaid slot.

The novel features of the present invention are set forth with particularity in the appended claims. The present invention, both as to its organization and manner of operation, together with further objects and advantages thereof, may best be understood by reference to the following description, taken in connection with the accompanying drawings in which:

Fig. 1 is a perspective view of a portable seat constructed in accordance with the invention and shown in operative association with the wheel of a golf cart;

Fig. 2 is a cross sectional view taken along line 2—2 of Fig. 1;

Fig. 3 is a plan view of the underside of the seat shown in Fig. 1, but illustrated in a folded condition, a portion thereof being represented as cut away and in section;

Fig. 4 is a plan view, taken in the direction of arrow 4 in Fig. 1;

Fig. 5 is a view similar to that illustrated in Fig. 3, but representing a modification which may be made to the seat in accordance with the invention;

Fig. 6 is a perspective view of a seat constructed in accordance with another embodiment of the invention shown in an operative condition; and Fig. 7 is a plan view of the underside of the seat shown in Fig. 6, but illustrated in a folded condition.

As shown in Fig. 1 of the drawings, a portable seat embodying the present invention may be associated with a golf cart 8 used to transport a golf club bag 9 and having wheels 10 and 11. The seat comprises a flat, plate-like seat member 12 which may be constructed of plywood. Seat member 12 functions as a load-supporting member and includes an end portion 13 having an elongated slot 14 for receiving a portion of wheel 11 and includes an opposite portion 15. Slot 14 has a width essentially equal to the maximum width of wheel 11 and a length to be defined hereinafter.

The portable seat further comprises leg means 16 in the form of a generally triangularly shaped frame that may be constructed of a metal rod and has an apex portion 17 connected to portion 15 of seat member 12. Leg means 16 also includes a bight portion 18 of the triangular frame which is adapted to engage the ground. Portion 18 is parallel to slot 14 and in the position shown in Fig. 1 is spaced from the underside of seat member 12 by a distance greater than the radius but smaller than the diameter of wheel 11. This distance is selected to maintain the seat member essentially parallel to the ground. In addition, ground-engaging portion 18 of leg 16 preferably should be at least as long as slot 14 for good stability.

To obtain a parallel relation between seat member 12 and the ground, the dimensional relationship between the length of slot 14 and the effective length of leg means 16 may be arranged in a manner which may be best appreciated by referring to the cross sectional representation of Fig. 2 wherein the radius of wheel 11 is designated by the letter $r$. If $s$ denotes the length of slot 14, and $(r+h)$ defines the effective or vertical length of leg means 16, it may be readily shown that for the desired parallelism of the seat and the ground, $$s = 2\sqrt{r^2 - h^2} \qquad (1)$$

The manner in which leg means 16 is connected to seat member 12 may be best seen in the underside view of the seat embodying the invention represented in Fig. 3. In the vicinity of end portion 15, there is secured to the underside of seat member 12 a T-shaped block 19 which may be fabricated of wood. Member 19 includes a body portion 20 having an opening or channel in its upper surface forming together with an adjacent portion of the lower surface of seat member 12a bore 21 extending in parallel relation to slot 14. The free ends of apex portion 17 of leg means 16 extend into opposite ends of bore 21, for example, as illustrated by an end designated by the numeral 22.

Apex portion 17 thus is pivotally connected to seat member 12 and the distance between sides of leg means 16 in the vicinity of apex portion 17 is essentially equal to the width of body portion 20 of member 19. Accordingly, the transverse portion 23 of T member 19 serves as a stop which limits pivotal movement of leg means 16, as shown in Fig. 4.

Preferably, leg means 16 should be tilted relative to a vertical plane in a direction away from wheel 11 to achieve a greater stability than otherwise possible. This tilt, designated by the angle $\alpha$ in Fig. 4, may be on the order of 5–10° and leg means 16 extends from seat member 12 an effective, or vertical distance $(r+h)$ defined in Formula 1 above.

Secured to the free end of body member 20 is an L-shaped hook 24. Accordingly, when leg means 16 is pivoted or folded into engagement with the underside of seat member 12, the hook 24 may be employed as a hanger to support the seat embodying the invention, for example, at the open end of golf bag 9.

When the golfer decides to rest, he merely removes the seat from the place where it is carried, pivots leg means 16 away from seat member 12 to the position illustrated in Fig. 4 and positions slot 14 on wheel 11. Thus, the golfer may rest himself on the stable support afforded by the seat constructed in accordance with the present invention. In addition, since wheel 11 is engaged at its periphery by end portions of slot 14, the weight of the golfer acting on the wheel serves as a brake thereby to prevent movement of cart 8.

From an inspection of Figs. 1–4, it is evident that a portable seat embodying the present invention may be constructed of relatively simple parts and thus it may be inexpensively fabricated. In addition, it may be folded into a readily portable size and yet may be easily put into operative relation with the wheel of a golf cart or the like.

In the modified arrangement illustrated in Fig. 5, the length of slot 14' in seat member 12' may be adjustably fixed. This is accomplished by providing a slot in seat member 12' substantially longer than slot 14 shown in Fig. 1 and equipping the underside of the seat member with a pair of flat plates 25 and 26 supported at respective ends of slot 14' for sliding movement. To this end, plate 25 is provided with a pair of slots 27 extending parallel to slot 14' and plate 26 is provided with slots 28 that are similarly oriented. A pair of screws 29 may be employed to clamp plate 25 to the underside of seat member 12' and similarly a pair of screws 30 may be employed to clamp plate 26. Thus, the spacing between opposed end portions 31 and 32 of plates 25 and 26 may be adjustably fixed to accommodate any one of a variety of wheel diameters so as to maintain a desired parallel relationship between the seat member and the ground.

Alternatively, leg means 16 may be adjustable in its effective length and slot 14 (Fig. 1) may be fixed. Obviously, this type of adjustment can be employed to accommodate any one of a variety of wheel sizes and yet maintain a parallel relation between seat member 12 and the ground.

In Fig. 6 there is illustrated another embodiment of the present invention, viewed from its underside. This embodiment includes a first generally U-shaped frame 40 including arm portions 41 and 42 which extend parallel to one another from a bight portion 43. A load-supporting member 44 of flat, plate-like construction is fixed to arm portions 41 and 42 and is spaced from bight portion 43 to define a slot 45 for receiving a portion of wheel 11. Accordingly, member 44 together with frame 40 serve the same functions as does seat member 12 of the embodiment shown in Figs. 1–4.

The seat further comprises a second generally U-shaped frame 46 substantially like frame 40 and including arm portions 47 and 48 pivotally connected at their extremities to respective extremities of arm portions 41 and 42. Arm portions 47 and 48 extend an effective distance from seat member 44 defined in accordance with Equation 1 above and are connected by a bight portion 49. The various portions 41–43 and 47–49 are of channel-shaped cross section and the portions 41 and 42 are slightly wider than portions 47 and 48 so that the former arms may receive the latter arms when frame 46 is pivoted inwardly toward seat member 46 to the position shown in Fig. 7.

The ends 50 and 51 of arms 47 and 48 adjacent the pivotal connection are positioned to engage the surfaces of corresponding ends 52 and 53 of arms 41 and 42 when frame 48 is pivoted to its operative position shown in Fig. 6. Thus, pivotal movement is limited so that frame 46 may be maintained substantially perpendicular to the plane of seat member 44.

In constructing the seat embodying the invention as illustrated in Figs. 6 and 7, seat member 46 may be fabricated of wood and the frames 40 and 46 may be fabricated of conventional metal channel stock. Accordingly, the device is relatively simple and inexpensive to construct.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

We claim:

1. A seat adapted to be operatively associated with the wheel of a golf cart or the like comprising a seat member including a portion having a slot for receiving a portion of a wheel with which said seat is adapted to be operatively associated and including an opposite portion, and leg means connected to said opposite portion of said seat member and extending therefrom an effective distance greater than the radius but smaller than the diameter of the wheel.

2. A detachable seat adapted to be mounted on the wheel of a golf cart or the like, comprising seat means, leg means pivotally connected to a forward portion of said seat means and adapted to be folded substantially parallel to said seat means and to be extended to a position substantially perpendicular to said seat means, said leg means being of length greater than the radius of the wheel to which said seat is adapted to be attached and less than the diameter of said wheel, and a slot in the rear portion of said seat means adapted to fit an upper portion of said wheel.

3. A seat adapted to be operatively associated with the wheel of a golf cart or the like, said wheel having a radius $r$ comprising a seat member including a portion having a slot for receiving a portion of a wheel with which said seat is adapted to be operatively associated and including an opposite portion, leg means connected to said opposite portion of said seat member and effectively extending therefrom a distance $(r+h)$, where $r>h$, said slot being of a width substantially equal to the width of the wheel and a length substantially equal to $2\sqrt{r^2-h^2}$.

4. A detachable seat adapted to be mounted on the wheel of a golf cart or the like, said wheel having a radius $r$ comprising seat means, leg means pivotally connected to a forward position of said seat means and adapted to be folded substantially parallel to said seat means and to be extended to a position substantially perpendicular to said seat means, said leg means being of length $(r+h)$, where $r>h$, and a slot in the rear portion of seat means, said slot being of width substantially equal to the width of said wheel and of length substantially equal to $2\sqrt{r^2-h^2}$.

5. A seat adapted to be operatively associated with the wheel of a golf cart or the like comprising a seat member including a portion having a slot for receiving a portion of a wheel with which said seat is adapted to be operatively associated and including an opposite portion, and leg means connected to said opposite portion of said seat member and extending therefrom an effective distance greater than the radius but smaller than the diameter of the wheel, said leg means having ground-engaging portions spaced from one another in a direction parallel to said slot by a distance at least equal to the length of said slot.

6. A seat adapted to be operatively associated with the wheel of a golf cart or the like comprising a seat member including a portion having a slot for receiving a portion of a wheel with which said seat is adapted to be operatively associated and including an opposite portion, a leg member of generally triangular configuration including one apex portion connected to said opposite portion of said seat member, and including a ground-engaging side portion opposite said apex portion spaced therefrom a distance greater than the radius, but smaller than the diameter of the wheel, said side portion having a length at least equal to the length of said slot.

7. A seat adapted to be operatively associated with the wheel of a golf cart or the like comprising a seat member including a portion having a slot for receiving a portion of a wheel with which said seat is adapted to be operatively associated and including an opposite portion, at least one member extending across the width of said slot and adjustably fixed to said seat member for adjusting the effective length of said slot, and leg means connected to said opposite portion of said seat member and extending therefrom an effective distance greater than the radius but smaller than the diameter of the wheel.

8. A seat adapted to be operatively associated with the wheel of a golf cart or the like comprising a generally U-shaped frame having arm portions and a bight portion, a seat member fixed to said arm portions of said U-shaped frame and spaced from said bight portion thereof to define a slot for receiving a portion of a wheel with which said seat is adapted to be operatively associated, and leg means connected to said U-shaped frame and extending therefrom an effective distance greater than the radius but smaller than the diameter of the wheel.

9. A seat adapted to be operatively associated with the wheel of a golf cart or the like comprising a first generally U-shaped frame having arm portions and a bight portion, a seat member fixed to said arm portions of said U-shaped frame and spaced from said bight portion thereof to define a slot for receiving a portion of a wheel with which said seat is adapted to be operatively associated, and a second generally U-shaped frame having a configuration substantially like said first U-shaped frame and including arm portions pivotally connected at their extremities to respective extremities of said arm portions of said first frame and extending therefrom an effective distance greater than the radius but smaller than the diameter of the wheel, said arms of said first and said second frames being of channel-shaped cross section, each of the arms of one of said frames being arranged to receive one of the arms of the other of said frames.

References Cited in the file of this patent
UNITED STATES PATENTS

| | | |
|---|---|---|
| 2,210,632 | Perrill | Aug. 6, 1940 |
| 2,442,889 | Deal | June 8, 1948 |
| 2,610,072 | Head | Sept. 9, 1952 |
| 2,673,589 | Kunkel | Mar. 30, 1954 |